Patented Aug. 29, 1944

2,356,932

UNITED STATES PATENT OFFICE 2,356,932

ZINC SALTS OF MERCAPTOTHIAZOLINES

Paul C. Jones, Silver Lake, and Roger A. Mathes, Akron, Ohio, assignors to The B. F. Goodrich Company, New York, N. Y., a corporation of New York No Drawing. Original application February 8, 1939, Serial No. 255,358, now Patent No. 2,288,194, dated June 30, 1942. Divided and this application January 21, 1942, Serial No. 427,608

3 Claims. (Cl. 260—302)

This application is a division of application Serial No. 255,358, filed February 8, 1939, now Patent 2,288,194, issued June 30, 1942. The claims in the parent case are directed to the process of vulcanizing rubber in the presence of certain thiazoline compounds, and to rubber compositions comprising these compounds. The claims in this application are directed to the mixed zinc salts of fatty acids and 2-mercaptothiazoline or its simple homologues. These salts are those in which one valence of a zinc atom is satisfied by a salt-forming anionic fatty acid residue, and the other valence by a mercaptothiazoline residue formed by removal of the acidic hydrogen of a 2-mercaptothiazoline. The zinc salts of 2-mercaptothiazolines alone are claimed in our copending divisional application Serial No. 503,107 filed September 20, 1943. Besides 2-mercaptothiazoline, related compounds wherein one or more of the hydrogens on the carbon atoms is replaced by aliphatic or aromatic groups may be employed to form these salts. Such salts can be prepared from 2-mercapto 4-methylthiazoline; 2-mercapto 5-methylthiazoline; 2-mercapto 4-phenylthiazoline; 2-mercapto 4-methoxymethylthiazoline; 2-mercapto 4-anisylthiazoline; 2-mercapto 4-chlormethylthiazoline; 2-mercapto 4-(p-amino) phenylthiazoline; 2-mercapto 4,4-diethylthiazoline; 2-mercapto 4,5-dimethylthiazoline; and 2-mercapto 4,5-tetramethylenethiazoline.

As an illustration of the value of the salts of this invention as accelerators for the vulcanization of rubber, the following compositions were prepared:

|  | Composition | | |
|---|---|---|---|
|  | A | B | C |
| Rubber | 100 | 100 | 100 |
| Zinc oxide | 5 | 5 | 5 |
| Sulfur | 3.5 | 3.5 | 3.5 |
| Zinc salt of 2-mercaptothiazoline | 1 | 1 | 1 |
| Lauric acid | 0 | 3 | 0 |
| Zinc stearate | 0 | 0 | 2.13 |

When these compositions were cured in a heated mold for varying times at 287° F., compositions having the following characteristics were obtained, T signifying tensile strength in lbs./in.² and E signifying the ultimate elongation in percent.

| Time of cure in min. at 287° F. | Composition | | | | | |
|---|---|---|---|---|---|---|
|  | A | | B | | C | |
|  | T | E | T | E | T | E |
| 20 | 1,715 | 950 | 3,645 | 805 | 3,110 | 860 |
| 45 | 2,220 | 915 | 3,945 | 730 | 3,540 | 805 |
| 60 | 2,380 | 905 | 3,665 | 690 | 3,510 | 775 |

It will be observed that while the metallic salt of the mercaptothiazoline was a poor accelerator when used alone, it possessed great activity when used in the presence of a monocarboxylic acid or a metallic salt of a monocarboxylic acid.

In addition to showing great activity at vulcanizing temperatures, the zinc salts of the 2-mercaptothiazolines exhibit excellent delayed action. Thus, if 2-mercaptothiazoline were used as the accelerator in Composition B, it would form a rather scorchy compound which attains a tensile strength of about 1700 lbs./in.² in 30 minutes at 220° F. This makes the processing of the stock rather difficult. On the other hand, Composition B containing the zinc salt of 2-mercaptothiazoline does not cure at all in 30 minutes at 220° F. and only reaches a tensile strength of about 1300 lbs./in.² in 60 minutes at 220° F. This inactivity at processing temperature does not extend into the curing range, however, as can be seen by the curing characteristics of Composition B at 287° F.

It will be observed that some of the rubber compositions cited above contain the zinc salt of a 2-mercaptothiazoline and a fatty acid. It has been found that the functions of these compounds may be combined in a single material by reacting zinc oxide, a 2-mercaptothiazoline, and a fatty acid before incorporation in the rubber to form mixed zinc salts of fatty acids and 2-mercaptothiazolines containing the structure

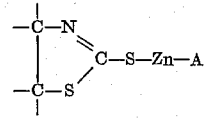

wherein A is a fatty acid residue. This modification of the invention is advantageous because the relatively high-melting zinc salts of 2-mercaptothiazolines are sometimes rather difficult to disperse, while the lower-melting mixed zinc salts of a 2-mercaptothiazoline and a saturated or unsaturated fatty acid, preferably one containing eight or more carbon atoms, have equivalent accelerating activity and are easily dispersed in rubber.

The mixed zinc salts of 2-mercaptothiazolines and fatty acids may be prepared by reacting a fatty acid, zinc oxide and a 2-mercaptothiazoline in a 1:1:1 ratio, one mole of water being split off. Thus, 8.1 parts by weight of zinc oxide, 28.4 parts of stearic acid, and 11.9 parts of 2-mercaptothiazoline are reacted by stirring and heating the melted reactants until 1.8 parts of water are given off and a homogeneous mixture is obtained. The mixed salts are in general soap-like materials which melt below 120° C., and are much more easily dispersed in rubber than the higher-melting zinc salts of mercaptothiazolines. The zinc salt of 2-mercaptothiazoline, for instance, from which the foregoing accelerator was prepared melted at about 235° C., while the mixed salt melted at about 115°–120° C.

To demonstrate the effectiveness of the accelerators of this invention, the following compositions were prepared.

|  | Composition | | | |
|---|---|---|---|---|
|  | A | B | C | D |
| Rubber | 100 | 100 | 100 | 100 |
| Zinc oxide | 5 | 5 | 5 | 5 |
| Sulfur | 3.5 | 3.5 | 3.5 | 3.5 |
| Mixed zinc salt of 2-mercaptothiazoline and caprylic acid | 2.18 | 0 | 0 | 0 |
| Mixed zinc salt of 2-mercaptothiazoline and stearic acid | 0 | 3.13 | 0 | 0 |
| Mixed zinc salt of 2-mercaptothiazoline and lauric acid | 0 | 0 | 2.56 | 0 |
| Mixed zinc salt of 2-mercaptothiazoline and cottonseed fatty acid | 0 | 0 | 0 | 3.13 |

Good dispersions of all of the above accelerators in the rubber compositions were obtained with ease.

The characteristics of the above compositions cured for varying times at 287° F. were as follows, T signifying tensile strength at break in lbs./in.$^2$ and E signifying ultimate elongation in per cent:

| Min. of cure | Composition | | | | | | | |
|---|---|---|---|---|---|---|---|---|
|  | A | | B | | C | | D | |
|  | T | E | T | E | T | E | T | E |
| 30 | 3,145 | 855 | 3,450 | 815 | 3,210 | 855 | 3,265 | 815 |
| 45 | 3,510 | 840 | 3,770 | 800 | 3,335 | 820 | 3,215 | 800 |
| 60 | 3,535 | 815 | 3,640 | 765 | 3,405 | 805 | 3,515 | 805 |

It will be observed that all of the materials tested were good accelerators of vulcanization.

Any of the saturated or unsaturated monobarboxylic acids such as caprylic, palmitic, oleic, ricinoleic, benzoic, salicylic, toluic, or other like acids may be employed in place of the materials used in the specific examples.

We claim:
1. A compound having the structure

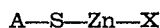

where A is a thiazoline group attached at the 2-position to the sulfur atom and contains no additional substituent groups other than hydrogen, alkyl, aryl, and alkoxy groups, and X is a salt-forming anionic fatty acid residue.

2. The mixed zinc salt of 2-mercaptothiazoline and a fatty acid.

3. The mixed zinc salt of 2-mercaptothiazoline and stearic acid.

PAUL C. JONES.
ROGER A. MATHES.